C. H. LOUDEN.
WEIGHT MOTOR.
APPLICATION FILED JUNE 20, 1919.
1,329,050.
Patented Jan. 27, 1920.
2 SHEETS—SHEET 1.
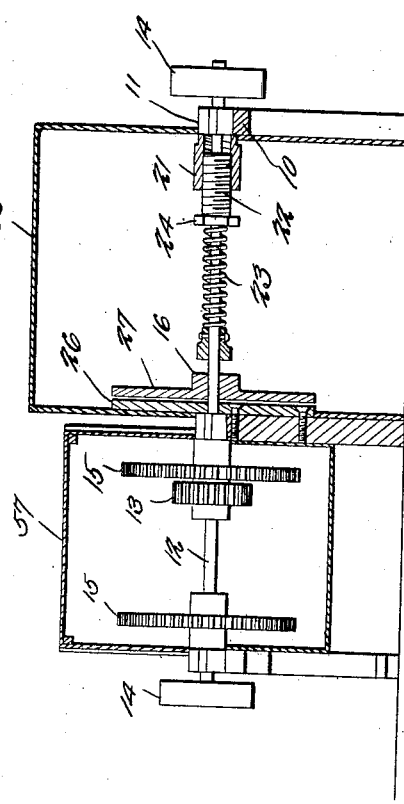

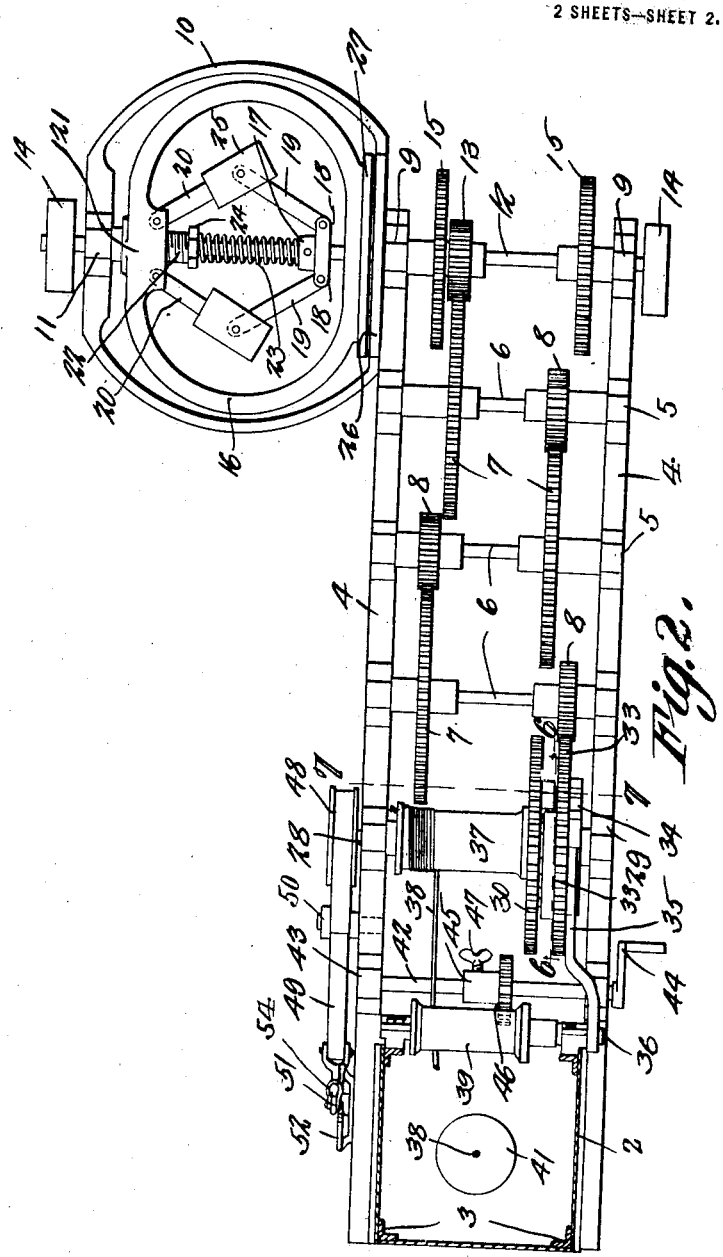

UNITED STATES PATENT OFFICE.

CHARLES H. LOUDEN, OF CASSCOE, ARKANSAS.

WEIGHT-MOTOR.

1,329,050. Specification of Letters Patent. Patented Jan. 27, 1920.

Application filed June 20, 1919. Serial No. 305,483.

*To all whom it may concern:*

Be it known that I, CHARLES H. LOUDEN, a citizen of the United States, residing at Casscoe, in the county of Arkansas and State of Arkansas, have invented a new and useful Weight-Motor, of which the following is a specification.

This invention relates to improvements in weight motors, the object of the invention being to provide a machine of this character which is adapted to operate any desired machinery, and which machine is comparatively simple in construction and highly efficient in use.

A further object of the invention is to provide, in combination with a machine of the character set forth, means for controlling the speed of rotation of the driving shaft and means for locking the machine when not in use.

With the foregoing and other objects in view, which will appear as the description proceeds, the invention consists in the novel features of construction and combination of parts which will be more fully described hereinafter and particularly pointed out in the claim.

In the drawings accompanying and forming part of this specification,

Figure 1 illustrates a sectional view through the governor and its casing, and Fig. 2 illustrates a longitudinal sectional view through the mechanism associated with the governor showing the governor as applied.

The same characters of reference designate the same parts in the different figures of the drawings.

Referring to the drawings, 2 designates a suitable tower of any desired height, to which is secured at right angles thereto a framework comprising a plurality of uprights and horizontal beams 4 secured to the tower and resting on the upper ends of the uprights, not shown. On the beams 4 at each side of the structure are secured a plurality of bearing blocks 5, in which are mounted for rotation a plurality of shafts 6, each having secured thereto at one side of the machine a gear 7 and at the opposite side a pinion 8, the gears and pinions on successive shafts being disposed at opposite sides of the machine, whereby the gear on one shaft meshes with the pinion on the next succeeding shaft, so that motion imparted to the first shaft of the series will be transmitted through said gears and pinions to the last shaft. An additional pair of bearing blocks 9 are secured to the horizontal members 4 at their extreme ends, and secured to one side of the machine in concentric relation to such bearing blocks is a framework 10, at one end of which is secured a bearing block 11 in alinement with the bearing blocks 9. In the bearings 9 and 11 is mounted for rotation a long shaft 12, on which is secured a pinion 13 adapted to mesh with the last gear 7 of the train hereinbefore described. On this shaft 12 are also secured a pair of pulleys 14, one at each extreme end of the shaft, and a pair of gears 15 for transmitting motion to any desired machinery by means of a belt running over either of said pulleys or having one or both of its gears 15 mesh with gearing carried by such machinery. For checking the speed of rotation of the shaft 12 I provide a suitable governor, which in the present instance comprises a yoke 16 preferably of oval shape, which is loosely mounted on the shaft. Secured to the shaft for rotation therewith is a collar 17 having at diametrically opposite points a pair of radially extending perforated ears 18, in which are pivoted a pair of links 19, the free ends of which are pivoted in a pair of weights 25, which are secured to the ends of a second pair of links 20 having their opposite ends pivoted in a head 21 carried by the member 16 and threaded on a bushing 22, which is mounted for sliding movement on the shaft, thus forming a toggle connection between the collar 17 and the head. A coil spring 23 encircles the shaft and has one end bearing against the collar 17 and its opposite end against a collar 24 carried by the bushing 22. From this construction it will be observed that when the weights swing outwardly the head 21, and thereby the entire member 16, is drawn toward the collar 17. Therefore, by securing a disk 26 to the end of the frame 10 and another disk 27 to the member 16, it will readily be seen that as the frame 16 is pulled by the centrifugal force of the weights 25 the disk 27 will contact with the stationary disk 26, whereupon the friction between said disks will reduce the speed of rotation of the shaft 12.

A shaft 28 is mounted for rotation in bearing blocks 29 carried on the horizontal members 4 near the tower, and on this shaft is secured a gear 30. The gear 33 has secured thereto at one side thereof a ratchet 34 adapted to be engaged by a suitable dog 35 pivotally carried by a shaft 36 mounted in bearings secured to the front of the tower. A drum 37 is secured on the shaft 28, and around this drum is wound a cable 38, which cable passes under a drum 39 secured to the shaft 36 and up through the tower to the top theeerof, where it passes over a pulley mounted for rotation on the framework of the tower, the cable then passing downward to the bottom of the tower and being provided with weights 41, the lowermost one of which is permanently secured to the cable. For winding the cable on the drum 37, a shaft 42 is mounted for rotation in bearings 43 carried by the horizontal frame members 4, a crank 44 being provided for permitting manual rotation thereof. On the shaft 42 is slidably secured a collar 45 having secured thereto a pinion 46, which is adapted to be slid into mesh with the gear 30 for transmitting rotary motion to the drum 37 for winding the cable thereon, a thumb screw 47 being threaded into the collar 45 and adapted to retain the collar in adjusted position. On one end of the drum shaft 28 is secured a pulley 48, around which passes a brake band 49 having one end thereof secured to the frame at 50 and the other end to a lever 51, the lever being pivoted to the frame at one side of the tower and provided with the usual spring-pressed trigger adapted to engage one of a series of notches formed in a frame 52 secured to the framework, the trigger being connected at its rear end by means of a connecting rod to a pivoted handle 54 for releasing the trigger to permit the lever to be shifted. A locking means is provided for retaining the lever in any of its adjusted positions, and in the present instance this means comprises a set screw threaded into the lever and adapted to bind on the frame 52.

The operation of the machine is as follows: The lever is shifted rearwardly so as to release the brake band from engagement with the pulley 48. The collar 45 is then slid on the shaft 42 to bring its pinion 46 into mesh with the gear 30 carried by the drum shaft, and the thumb screw tightened. The shaft 42 is then turned by means of the crank handle to wind the cable on the drum 37 until the weight arrives at the top of the tower. The lever is then shifted so as to set the brake band, and while the drum shaft is being thus held the collar 45 is slid so as to carry its pinion out of mesh with the gear 30 and the thumb screw tightened to retain it in that position, whereupon the lever 51 is again shifted to release the brake. The weight then descends by gravity and causes the cable to unwind from the drum 37, and by means of the ratchet and pawl connection between the gears 30 and 33 the latter gear is rotated, thereby transmitting its motion through the train of gears to the last gears 15 and pulleys 14. It will be understood, of course, that the proportions of the gears may be changed, if desired, to vary the ratio of the speed of the shaft 12 to that of the drum shaft 28. When the machine is not in use the lever may be shifted to its extreme forward position and the set screw turned into tight engagement with the frame 52 and, after the hasp has been placed thereon, a padlock may be locked through the opening in the head of the set screw and thereby prevent unauthorized tampering with the machine.

While I have described in detail the structure herein illustrated, it is to be understood that I do not thereby limit my invention to the precise features of construction shown, as I am aware that many mechanical changes and modifications may be made therein without departing from the spirit and scope of the invention as set forth in the claim hereto appended.

Having thus described my invention, what I claim is:

In a device of the kind described, a governor including a stationary disk, a shaft having one of its ends disposed centrally of the stationary disk, a yoke supported on the shaft, a disk carried by the yoke, and coöperating with the stationary disk, said yoke having a threaded head, a bushing adjustable within the threaded head and surrounding the shaft, a coiled spring having one of its ends connected to the shaft, the opposite end thereof contacting with the bushing, whereby the tension of the coiled spring is regulated and weight controlled means for moving the coiled spring longitudinally of the shaft, in one direction.

In testimony that I claim the foregoing as my own, I have hereto affixed my signature in the presence of two witnesses.

CHARLES H. LOUDEN.

Witnesses:
J. H. SIMMONS,
O. P. TRICE.